(12) United States Patent
Haanpaa et al.

(10) Patent No.: US 6,281,651 B1
(45) Date of Patent: *Aug. 28, 2001

(54) HAPTIC POINTING DEVICES

(75) Inventors: Douglas Haanpaa, Ann Arbor; Gary Siebert, Dexter; Terry Cussen, Ann Arbor; Kirk Fifer; Mike Dinsmore, both of Ypsilanti; Charles J. Jacobus, Ann Arbor, all of MI (US)

(73) Assignee: Immersion Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,152

(22) Filed: Nov. 3, 1998

Related U.S. Application Data
(60) Provisional application No. 60/064,077, filed on Nov. 3, 1997.

(51) Int. Cl.[7] .......................................................... B25J 9/18
(52) U.S. Cl. ............................... 318/568.11; 318/568.16; 414/7; 414/5; 74/471 XY; 434/45
(58) Field of Search ....................... 318/568.11, 568.16; 414/7, 5; 74/471; 434/45

(56) References Cited

U.S. PATENT DOCUMENTS

| | | | |
|---|---|---|---|
| 3,490,059 | 1/1970 | Paulsen et al. | 73/133 |
| 3,795,150 | 3/1974 | Eckhardt | 74/5.4 |
| 3,919,691 | 11/1975 | Noll | 340/172.5 |

(List continued on next page.)

FOREIGN PATENT DOCUMENTS

| | | | |
|---|---|---|---|
| 0085518 | 8/1983 | (EP) | G05D/1/00 |
| 0626634 A2 | 11/1994 | (EP) | G06F/3/00 |
| 4-34610 A | 2/1992 | (JP) | G05G/9/02 |
| WO 94/26167 | 1/1994 | (WO) | A61B/6/00 |
| WO 95/20788 | 8/1995 | (WO) | G06F/3/00 |
| WO 95/32459 | 11/1995 | (WO) | G06F/3/00 |
| WO 96/22591 | 7/1996 | (WO) | G09G/5/00 |

OTHER PUBLICATIONS

M. Ouh–young, D. Beard, F. Brooks, Jr., "Force Display Performs Better than Visual Display in a Simple 6–D Docking Task," IEEE, 1989, pp. 1462–6.

W. Kim, P. Schenker, "A Teleoperation Training Simulator with Visual and Kinesthetic Force Virtual Reality," Cal. Inst. Of Technology.

(List continued on next page.)

Primary Examiner—Karen Masih
(74) Attorney, Agent, or Firm—Gifford, Krass, Groh, Sprinkle, Anderson & Citkowski, PC

(57) ABSTRACT

A haptic pointing device includes a plurality of rigid, elongated proximal members, each connected to a separate rigid, elongated distal member through an articulating joint. The other end of each proximal member is coupled to an actuator such as a motor, causing that member to swing within a separate plane perpendicular to the shaft of the motor in response to a control signal. An end-effector is interconnected to the second end of each distal member through an articulating joint, such that as the actuators move the proximal members, the end-effector moves in space. In a preferred embodiment, the device includes at least three proximal members and three distal members, and the end-effector is coupled to a user-graspable element such as a stylus which retains a preferred orientation in space as the members are driven by the actuators. In a force-feedback application, the haptic pointing device further includes a position sensor associated with each degree of freedom, and haptic processing means interfaced to a virtual reality system or teleoperations environment. Additional components may be provided to increase flexibility, degrees of freedom, or both.

25 Claims, 16 Drawing Sheets

U.S. PATENT DOCUMENTS

| | | | |
|---|---|---|---|
| 4,216,467 | 8/1980 | Colston | 340/365 L |
| 4,398,889 | 8/1983 | Lam et al. | 434/45 |
| 4,436,188 | 3/1984 | Jones | 188/378 |
| 4,477,043 | 10/1984 | Repperger | 244/223 |
| 4,560,983 | 12/1985 | Williams | 340/825 |
| 4,604,016 | 8/1986 | Joyce | 414/7 |
| 4,632,341 | 12/1986 | Repperger et al. | 244/230 |
| 4,775,289 | 10/1988 | Kazerooni | 414/735 |
| 4,795,296 | 1/1989 | Jan | 414/5 |
| 4,800,721 | 1/1989 | Cemenska et al. | 60/393 |
| 4,811,608 | 3/1989 | Hilton | 73/862.04 |
| 4,823,634 | 4/1989 | Culver | 74/471 |
| 4,837,734 | 6/1989 | Ichikawa et al. | 364/513 |
| 4,853,874 | 8/1989 | Iwamoto et al. | 364/513 |
| 4,861,269 | 8/1989 | Meenen, Jr. | 434/45 |
| 4,868,549 | 9/1989 | Affinito et al. | 340/710 |
| 4,961,038 | 10/1990 | MacMinn | 318/696 |
| 4,962,448 | 10/1990 | DeMaio et al. | 364/146 |
| 4,982,918 | 1/1991 | Kaye | 244/243 |
| 4,983,901 | 1/1991 | Lehmer | 318/685 |
| 5,004,391 | 4/1991 | Burdea | 414/6 |
| 5,007,300 | 4/1991 | Siva | 74/471 XY |
| 5,018,922 | 5/1991 | Yoshinada et al. | 414/5 |
| 5,044,956 | 9/1991 | Behensky et al. | 434/45 |
| 5,062,594 | 11/1991 | Repperger | 244/175 |
| 5,076,517 | 12/1991 | Ferranti et al. | 244/228 |
| 5,103,404 | 4/1992 | McIntosh | 318/568.22 |
| 5,107,080 | 4/1992 | Rosen | 200/6 A |
| 5,107,262 | 4/1992 | Cadoz et al. | 341/22 |
| 5,116,051 | 5/1992 | Moncrief et al. | 273/448 |
| 5,116,180 | 5/1992 | Fung et al. | 414/5 |
| 5,142,931 | 9/1992 | Menahem | 74/471 XY |
| 5,143,505 | 9/1992 | Burdea et al. | 414/5 |
| 5,146,566 | 9/1992 | Hollis, Jr. et al. | 395/275 |
| 5,156,363 | 10/1992 | Cizewski et al. | 244/223 |
| 5,180,351 | 1/1993 | Ehrenfried | 482/52 |
| 5,182,557 | 1/1993 | Lang | 341/20 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,220,260 | 6/1993 | Schuler | 316/561 |
| 5,223,776 | 6/1993 | Radke et al. | 318/568.1 |
| 5,228,356 | 7/1993 | Chuang | 74/471 X |
| 5,235,868 | 8/1993 | Culver | 74/471 |
| 5,264,768 | 11/1993 | Gregory et al. | 318/561 |
| 5,286,203 | 2/1994 | Fuller et al. | 434/45 |
| 5,296,871 | 3/1994 | Paley | 345/163 |
| 5,297,057 | 3/1994 | Kramer et al. | 364/512 |
| 5,339,799 * | 8/1994 | Kami et al. | 318/568.11 |
| 5,341,459 | 8/1994 | Backes | 395/95 |
| 5,354,162 | 10/1994 | Burdea et al. | 414/5 |
| 5,382,885 | 1/1995 | Salcudean et al. | 318/568.11 |
| 5,389,865 | 2/1995 | Jacobus et al. | 318/568.11 |
| 5,396,266 | 3/1995 | Brimball | 345/161 |
| 5,397,323 | 3/1995 | Taylor et al. | 606/130 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,459,382 | 10/1995 | Jacobus et al. | 318/568.11 |
| 5,473,235 | 12/1995 | Lance et al. | 318/561 |
| 5,491,477 | 2/1996 | Clark et al. | 341/20 |
| 5,506,605 | 4/1996 | Paley | 345/163 |
| 5,512,919 | 4/1996 | Araki | 345/156 |
| 5,513,100 | 4/1996 | Parker et al. | 364/167.01 |
| 5,516,249 * | 5/1996 | Brimhall | 414/5 |
| 5,562,572 | 10/1996 | Carmein | 482/4 |
| 5,576,727 | 11/1996 | Rosenberg et al. | 345/179 |
| 5,577,981 | 11/1996 | Jarvik | 482/4 |
| 5,583,478 | 12/1996 | Renzi | 340/407.1 |
| 5,587,937 | 12/1996 | Massie et al. | 364/578 |
| 5,589,828 | 12/1996 | Armstrong | 341/20 |
| 5,589,854 | 12/1996 | Tsai | 345/161 |
| 5,619,180 | 4/1997 | Massimino et al. | 340/407.1 |
| 5,623,582 | 4/1997 | Rosenberg | 395/99 |
| 5,625,576 | 4/1997 | Massie et al. | 364/578 |
| 5,629,594 | 5/1997 | Jacobus et al. | 318/568.11 |
| 5,631,861 | 5/1997 | Kramer | 364/406 |
| 5,642,469 | 6/1997 | Hannaford et al. | 395/99 |
| 5,643,087 | 7/1997 | Marcus et al. | 463/38 |
| 5,666,138 | 9/1997 | Culver | 345/161 |
| 5,666,473 | 9/1997 | Wallace | 345/420 |
| 5,701,140 | 12/1997 | Rosenberg et al. | 345/156 |
| 5,709,219 | 1/1998 | Chen et al. | 128/782 |
| 5,714,978 | 2/1998 | Yamanaka et al. | 345/157 |
| 5,721,566 | 2/1998 | Rosenberg et al. | 345/161 |
| 5,731,804 | 3/1998 | Rosenberg | 345/156 |
| 5,734,373 | 3/1998 | Rosenberg et al. | 345/161 |
| 5,736,978 | 4/1998 | Hasser et al. | 345/173 |
| 5,739,811 | 4/1998 | Rosenberg et al. | 345/161 |
| 5,742,278 | 4/1998 | Chen et al. | 345/156 |
| 5,767,839 | 6/1998 | Rosenberg | 345/161 |
| 5,769,640 | 6/1998 | Jacobus et al. | 434/262 |
| 5,781,172 | 7/1998 | Engel et al. | 345/164 |
| 5,790,108 | 8/1998 | Salcudean et al. | 345/184 |
| 5,805,140 | 9/1998 | Rosenberg et al. | 345/161 |
| 5,821,920 | 10/1998 | Rosenberg et al. | 345/156 |
| 5,825,308 | 10/1998 | Rosenberg | 341/20 |
| 5,828,197 | 10/1998 | Martin et al. | 318/567 |
| 5,844,392 | 12/1998 | Peurach et al. | 318/568.17 |
| 5,872,438 | 2/1999 | Roston | 318/568.11 |
| 5,889,670 | 3/1999 | Schuler et al. | 364/186 |
| 6,109,407 * | 8/2000 | Bockmann et al. | 318/568.11 |
| 6,111,577 * | 8/2000 | Ziles et al. | 318/568 |

OTHER PUBLICATIONS

C. Winey, III, "Computer Simulated Visual and Tactile Feedback as an Aid to Manipulator and Vehicle Control", Mass. Inst. Of Tech., 1981, pp. 1–79.

J. Gotow, M. Friedman, M. Nagurka, J. Dolan, "Preception of Mechanical Properties at the Man–Machine Interface," Carnegie Mellon Univ., 1987, pp. 688–9.

T. Kotoku, K. Tanie, A. Fujikawa, Enviroment Modeling for the Interactive Display (EMID) used in Telerobotic Systems, 1991, pp. 999–1004.

S. Wiker, G. Vanderheiden, S. Lee, S. Arndt, "Development of Tactile Mice for Blind Access to Computers: Importance of Stimulation Locus, Object Size3, and Vibratactile Display Resolution", Univ. Of Wisconsin, 1991, pp. 708–12.

M. Ouh–young, "Force Display in Molecular Docking", Univ. Of N.C., 1990.

Y. Adachi, N. Matsui, "Sensory Evaluation of Virtual Haptic Push–Buttons", Suzuki Motor Corp.

P. Fischer, R. Daniel, K. Siva, "Specification and Design of Input Devices for Teleoperation, " IEEE, 1990, pp. 540–5.

L. Rosenberg, "Virtual fixtures as tools to enhance operator performance in telepresence enviroments," SPIE Telemanipulator Technology, 1993.

M. Yamakita, H. Shibasato, K. Furuta, "Tele–Virtual Reality of Dynamic Mechanical Model," IEEE, July 1992, pp. 1103–10.

H. Tan, N. Durlach, Y. Shao, M. Wei, "Manual Resolution of Compliance When Work and Force Cues are Minimized," ASME, 1993, PP. 99–104.

F. Brooks, Jr., M. Ohu–Young, J. Batter, P. Jerome, "Project GROPE–Haptic Displays for Scientific Visualization", *Computer Graphics*, vol. 24, No. 4, Aug. 1990, pp. 177–85.

B. Hannaford, Z. Szakaly, "Force–Feedback Cursor Control," NASA Tech Brief, vol. 13, No. 11, Nov. 1989.

M. Ohu–Young, M. Minsky, M. Behensky, F. Brooks, Jr. "Creating an Illusion of Feel: Control Issues in Force Display," Univ. of N. Carolina, Sept. 1989, pp. 1–14.

S. Fisher, M. McGreevy, J. Humphries, W. Robinett, "Virtual Environment Display System", NASA Ames Research Center, Oct. 1986.

J. Herndon, D. Jelatis, C. Jennrich, H. Martin, P. Satterlee, Jr. "The State–of–the–Art Model M–2 Maintenance System," p. 59–66.

M. Ouh–young, M. Pique, J. Hughes, N. Srinivasan, F. Brooks, Jr. "Using a Manipulator For Force Display in Molecular Docking", Univ. of N. Carolina, IEEE, 1988, PP. 1824–9.

S. Su, R. Furuta, "The Virtual Panel Architecture: A 3 D Gesture Framework," 1993, pp. 387–93.

S. Jacobson, F. Smith, D. Backman, E. Iversen, "High Performance, High Dexterity, Force Reflective Teleoperator II,"Univ. of Utah, 1991.

A. Bejczy, W. Kim, S. Venema, "The Phantom Robot: Predictive Displays for Teleoperation with Time Delay", IEEE, 1990, pp. 546–50.

H. Tan, M. Srinivasan, B. Eberman, B. Chen, "Human Factors for the Design of Force–Reflecting Haptic Interfaces," ASME, 1994.

J. Colgate, P. Grafing, M. Stanley, G. Schenkel, "Implementation of Stiff Virtual Walls in Force–Reflecting Interfaces, "Sept. 1993, Northwestern Univ.

H. Iwata, H. Noma, "Volume Haptization," IEEE, 1993, pp. 16–18.

L. Rosenberg, B. Adelstein, "Perceptual Decomposition of Virtual Haptic Surfaces," *Proc. IEEE Sym. on Res. Frontiers in Virtual Reality*, Oct. 1993.

L. Rosenberg, "The Use of Virtual Fixtures as Perpetual Overlays to Enhance Operator Performance in Remote Environments," U.S. Air Force, Sept. 1992.

L. Rosenberg, "Virtual haptic overlays enhance performance in telepresence tasks", Sanford Univ., 1994.

G. Burdea, J. Zhuang, "Dextrous telerobotics with force feedback —an overview," Rutgers Univ., 1991.

W. Kim, A. Bejczy, "Graphics Displays for Operator Aid in Telemanipulation,"IEEE, 1991, pp. 1059–67.

G. Burdea E. Roskos, D. Gomez, N. Langrana, "Distributed Virtual Force Feedback, " IEEE, May 1993, pp. 25–44.

P. Kilpatrick, "The Use of a Kinesthetic Supplement in an Interactive Graphics System," Univ. of N. Carolina, 1976.

Immersion Corporation Brochure, "3D Human Interface Tool" .

A. Kelly, S. Salcudean, "On the Development of a Force–Feedback Mouse and its Intergration into a Graphic User Interface," Univ. of British Columbia, 1991.

M. Minsky, M. Ohu–young, O. Steele, F. Brooks, Jr., M. Behensky, "Feeling and Seeing: Issues in Force Display", pp. 235–70.

L. Rosenberg, "Perceptual Design of a Virtual Rigid Surface Contact", Stanford University, Apr. 1993, pp. 1–40.

M. Akamatsu, S. Sata, "Multimodal Mouse: A Mouse–Type Device with Tactile and Force Display", *Presence*, vol. 3, No. 1, 1994, pp. 73–80.

B. Adelstein, M. Rosen, "Design and Implementation of a Force Reflecting Manipulandum for Manual Control Research", NASA–Ames Research Center, 1992.

H. Iwata, "Artificial Reality with Force–feedback: Development of Desktop Virtual Space with Compact Master Manipulator", *Computer Graphics*, vol. 24, No. 4, Aug. 1990, pp. 165–170.

L. Rosenberg, S. Brave, "The Use of Force Feedback to Enhance Graphical User Interfaces", *Stereoscopic Displays and Virtual Reality Systems III*, *Proc. SPIE*, 1996, pp. 243–248.

A. Kelly, S. Salcudean, "Magic Mouse: Tactile and Kinesthetic Feedback in the Human–Computer Interface using an Electromagnetically Actuated Input/Output Device", U. of Br. Columbia, 1993, pp. 1–26.

B. Schmult, R. Jebens, "Application Areas for a Force–Feedback Joystick", *ASME Advances in Robotics, Mechatronics, and Haptic Interfaces*, vol. 49, 1993, pp. 47–54.

M. Russo, "The Design and Implementation of a Three Degree–of–Freedom Force Output Joystick", May, 1990.

J. Payette, V. Hayward, C. Ramstein, D. Bergeron, "Evaluation of a Force Feedback (Haptic) Computer Pointing Device in Zero Gravity", *ASME*, 1996, pp. 547–53.

K. Hirota, M. Hirose, "Development of Surface Display", *IEEE*, 1993, pp. 256–62.

S. Salcudean, P. Drexel, D. Ben–Dov, A. Taylor, P. Lawrence, "a Six Degree–of–freedom, Hydraulic, One Person Motion Simulator", University of British Columbia.

D. Tavkhelidze, N. Davitashvili, "Kinematic Analysis of Five–Link Spherical Mechanisms", *Mechanism and Machine Theory*, vol. 9, 1974, pp. 181–90.

L. Rosenberg, S. Brave, "The Use of Force Feedback to Enhance Graphical User Interfaces".

M. Bostrom, S. Singh, C. Wiley, "Design of An Interactive Lumbar Puncture Simulator With Tactile Feedback", *IEEE*, 1993, pp. 280–86.

T. Howe, D. Kontarinis, "Task Performance with a Dextrous Teleoperated Hand Systen", *Proceedings of SPIE presented at Telemanipulator Technology '92*, vol. 1833, Nov. 1992, pp. 1–9.

B. Adelstein, M. Rosen, "A High Performance Two Degree–of–Freedom Kinesthetic Interface", Massachusetts Institute of Technology, 1992, pp. 108–12.

H. Iwata, "Pen–based Haptic Virtual Environment", *IEEE*, 1993, pp. 287–92.

V. Hayward, J. Choksi, G. Lanvin, C. Ramstein, "Design and Multi–Objective Optimization of a Linkage for a Haptic Interface", Mc Gill University, pp. 359–68.

P. Millman, J. Colgate, "Design of a Four Degree–of–Freedom Force–Reflecting Manipulandum with a Specified Force/Torque Workspace ", *IEEE Proceedings of International Conference on Robotics and Automation*, 1991, pp. 1488–92.

J. Batter, F. Brooks, Jr., "Grope–1: A Computer Display to the Sense of Feel", *Proc. IFIP Congress*, 1971, pp. 759–63.

P. Buttolo, B. Hannaford, "Pen–Based Force Display for Precision Manipulation in Virtual Environments", *IEEE*, 1995, pp. 217–224.

L. Rosenberg, "A Force Feedback Programming Primer", 1997, pp. 1–176.

R. Ellis, O. Ismaeil, M. Lipsett, "Design and Evaluation of a High–Performance Prototype Planar Haptic Interface", *Advances in Robotics, Mechatronics, and Haptic Interfaces*, vol. 49, Dec. 1993, pp. 55–64.

C. Ramstein, V. Hayward, "The Pantograph: A Large Workspace Haptic Device for a Multimodal Human–Computer Interaction", *Computer–Human Interaction*, 1994.

L. Rosenberg, "The Use of Virtual Fixtures to Enhance Operator Performance in Time Delayed Teleoperation", U.S. Air Force, Mar. 1993.

W. Atkinson, K. Bond, G. Tribble, III, K. Wilson, "Computing with Feeling", *Comput, & Graphics*, vol. 2, 1977, pp. 97–103.

B. Hannaford, L. Wood, D. McAfee, H. Zak, "Performance Evaluation of a Six Axis Generalized Force–Reflecting Teleoperator", *IEEE Transctions on Systems, Man and Cybernetics*, vol. 21, No. 3, May–Jun. 1991, pp. 620–33.

* cited by examiner

Horizontal (x,y) Plane

Vertical (y,z) Plane

HAPTIC POINTING DEVICES

REFERENCE TO RELATED APPLICATION

This application claims priority of U.S. provisional application Serial No. 60/064,077, filed Nov. 3, 1997, the entire contents of which are incorporated herein by reference

FIELD OF THE INVENTION

The present invention relates generally to force feedback and, in particular, to a family of haptic interface devices which exploit multiple redundant links to position a scribe or stylus in space.

BACKGROUND OF THE INVENTION

Force feedback devices originated in various specialized ways in the 1960s with teleoperations. Most of these devices were "replica" devices, wherein a smaller controlling or master robot was moved by an operator to control movement of a larger slaved robot. Forces detected at the slave were then also fed back to the operator through the master robot's actuators. Such prior art is substantially described in U.S. Pat. No. 5,389,865 to Jacobus et al.

In the late 1980s, NASA funded several experiments using force feedback devices which were not configured as having identical versions of a slave device. This was important at the time because an astronaut may want to control a number of kinds of space-based robots and cranes from one "universal" controller. To make this universal controller concept work, the master controller was connected logically to the slave through a network of computers which were capable of translating the master kinematics typically into Cartesian coordinates and from Cartesian to slave kinematics and back the other way.

Once this computer controller is in place on the master side of the system, it becomes possible to send inputs from the master (joystick, wheel, yoke, etc.) to a simulated slave rather than a real one, and to accept forces from the simulation for application to the master as well. This is one innovation described in U.S. Pat. Nos. 5,389,865 and 5,459,382 to Jacobus et al. As disclosed by Jacobus, this simulation need not be a real device, like a crane or robot, but may be a simulated automobile, boat, plane, or weapon. It can even be a simulation of a person performing tasks in a virtual world, such as walking, handling things, touching surfaces.

U.S. Pat. Nos. 5,459,382 and 5,389,865 describe an early device and method for providing users with a touch or tactile interface into a virtual world which allows the user to touch virtual objects, or objects which are not real, but rather are described by a model which resides inside a computer system. U.S. Pat. No. 5,389,865 and 5,629,594, and U.S. application Ser. No. 08/845,375 elaborate on these devices and the software architecture responsible for expressing abstract virtual models in the computer as forces created based on the position of the devices. U.S. application Ser. No. 08/861,080 describes in detail how a software architecture represents abstract virtual objects in terms of superpositions of virtual geometrical entities and dynamic special "feel" effects. U.S. application Ser. No. 08/859,877 describes how virtual objects and geometrical entities are built using CAD/CAM and geometrical design methods. U.S. application Ser. No. 08/859,157 describes how touch or haptic attributes are parameterized and represented using graphical user interface elements. All of the patents and applications discussed above are set forth herein in their entirety by reference.

SUMMARY OF THE INVENTION

Broadly, this invention resides in techniques and systems for combining tactile feedback elements to create a family of haptic or touch user interface devices. In particular, these combinations exploit multiple redundant links to position a scribe or stylus in a single, unique multi-degree of freedom position and orientation while presenting a force or force and torque to the stylus. The stylus, in turn, is pressed on the CAD/CAM or designer's hand, simulating tactile interaction with a virtual object within the device's volume of movement.

In a basic configuration, a haptic pointing device according to the invention includes a plurality of rigid, elongated proximal members, each connected to a separate rigid, elongated distal member through an articulating joint. The other ends of each proximal member is coupled to an actuator causing that member to swing within a separate plane in response to a control signal. An end-effector is interconnected to the second end of each distal member through an articulating joint, such that as the actuators move the proximal members, the end-effector moves in space. The various articulating joints may be universal joints, ball joints, of composed of a flexible material.

In a preferred embodiment, the device includes three proximal members and three distal members, enabling the end effector to move in three-dimensional space. The actuators preferably take the form of motors having a shaft perpendicular to the plane of movement of the proximal member coupled thereto. Different style motors, including pancake motors, may be used. In one configuration, the end-effector is coupled to a user-graspable element having a preferred orientation in space, with the arrangement of the members and joints being such that the element retains the preferred orientation as the end effector is moved by the actuators.

In a force-feedback application, the haptic pointing device further includes a position sensor associated with each proximal member, and haptic processing means operative to output an electronic signal indicative of the position of the end-effector in space, and receive an electronic signal causing the actuators to move the end-effector to a point in space. The haptic processing means may in turn be interfaced to a virtual reality system including descriptions of virtual objects, enabling a user to interact with the objects through the end effector. Alternatively, the haptic processing means may be interfaced to a slave system including a separate set of actuators and encoders, enabling a user to interact with the objects through the end effector as part of a teleoperations environment.

In alternative embodiments, additional components may be provided to increase flexibility, degrees of freedom, or both. For instance, the end-effector may be further coupled to a user-graspable element such as a handle or stylus to provide one or more additional degrees of freedom associated with roll, pitch and yaw. The system may include a pair of base platforms, each with its own set of actuated proximal and distal members for example, six sets of proximal and distal members may be utilized, three sets associated with each of the two base platforms. In all cases, the system may further conveniently include a docking station to receive the end effector for calibration purposes.

DETAILED DESCRIPTION OF THE INVENTION

Figure 1:
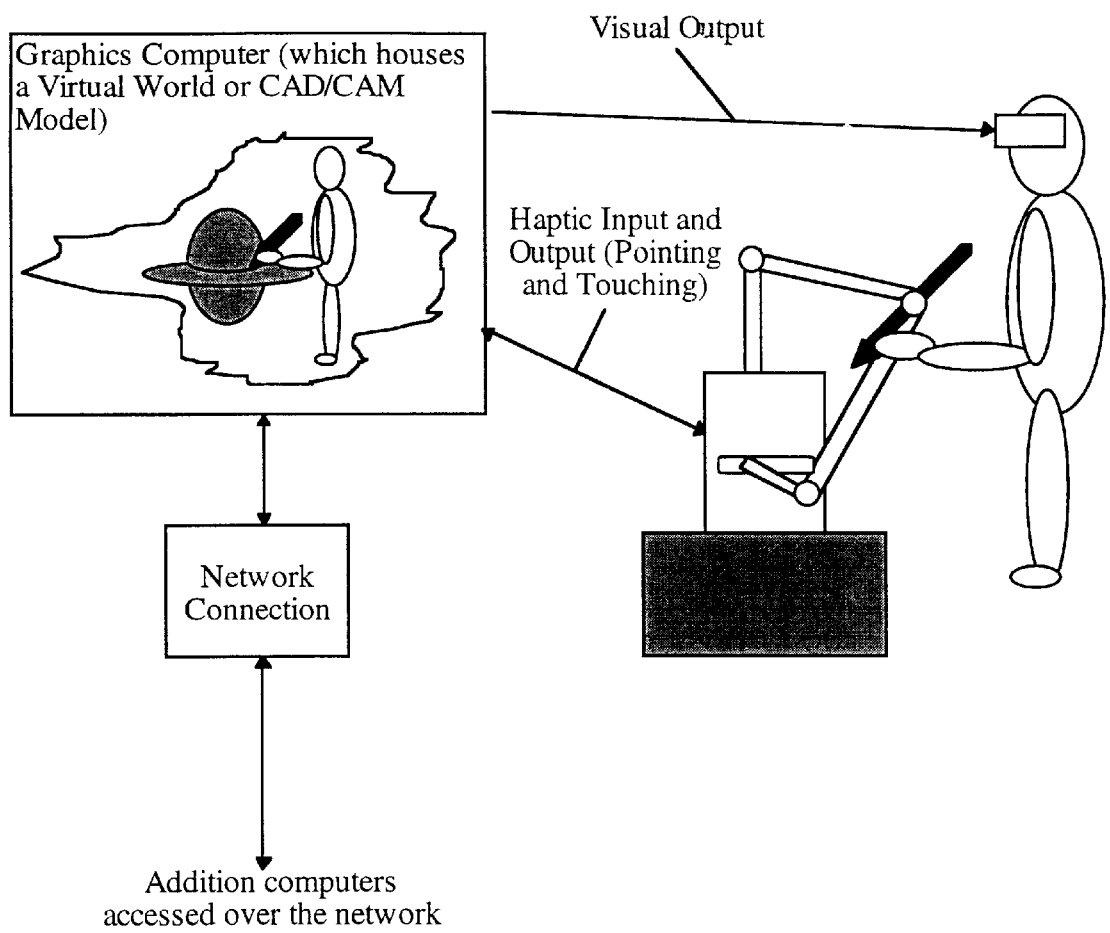
FIG. 1 is a drawing used to show how the invention may be employed to support the touching of geometric objects described within a virtual world interfaced to a haptic or tactile device.

FIG. 1 suggests how the invention may be employed to support touching of geometric objects described within a virtual world representation by a geometric probe logically attached to a haptic or tactile device. The representation to support touch is synchronized with a comparable representation of the world for visualization or graphical rendering, enabling the world to be both seen and touched. Because of the analogy to visualization entailed by this method, the generation of forces from the act of touching virtual objects is called haptic rendering (as a analog to visual rendering), and the act of both touching and viewing the objects (or other data) is referred to as browsing, and the software package which does the browsing is called a browser.

Generally speaking, the basis for the invention resides in alternative haptic device designs having at least some of the following properties:

low inertia and weight to provide very high haptic fidelity;

a desktop-oriented force feedback with range of motion comparable to a conventional computer mouse (the 2D workspace was to be nominally equal to that of a mousepad);

compatibility with 3D CAD data (i.e. CAD/CAM software representations);

low cost; and simple and reliable operation.

Figure 2:
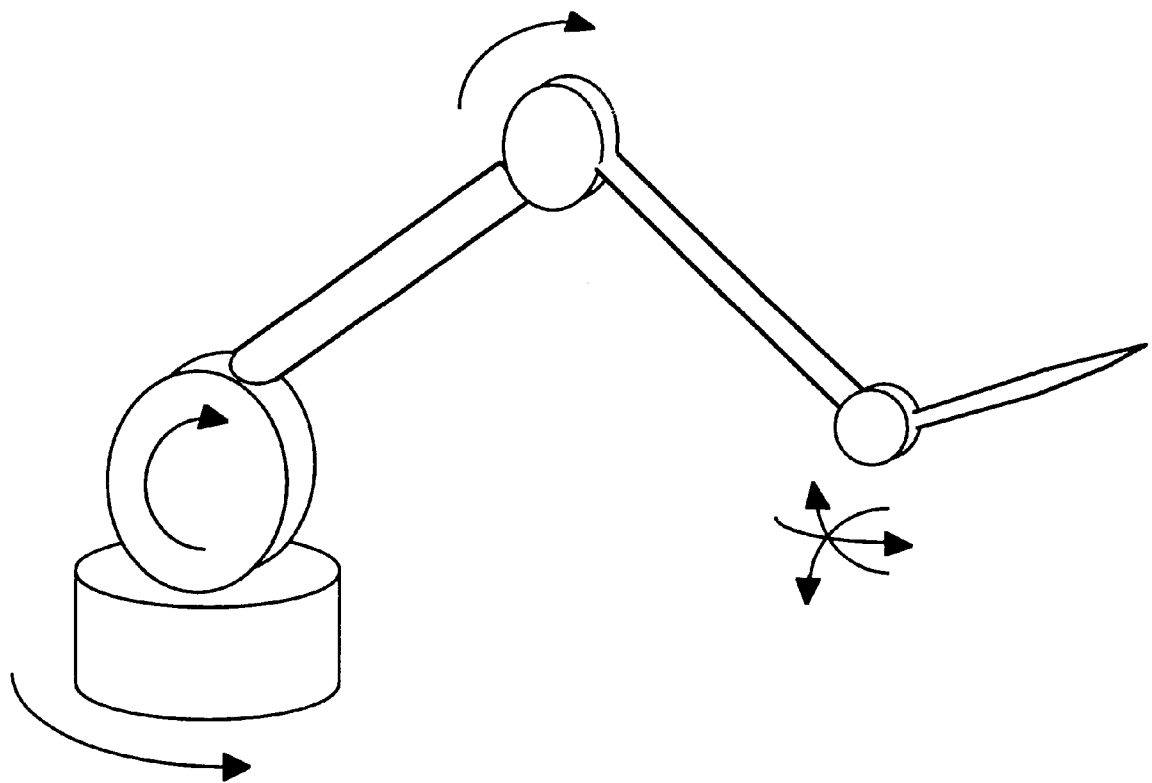
FIG. 2 is a drawing of a prior-art stylus which was found to be impractical for various reasons.

One promising haptic design is shown in FIG. 2. This design approach, while used in existing commercial devices, proved to be heavy, had high inertia, and exhibited significant backlash in the drive train when a low cost actuation motor/gear system was used. The design also exhibits problems with structure flex and timing belt/cable tensioning. Although these problems could be corrected with effort, the overall design is too far from ideal overall.

Figure 3:
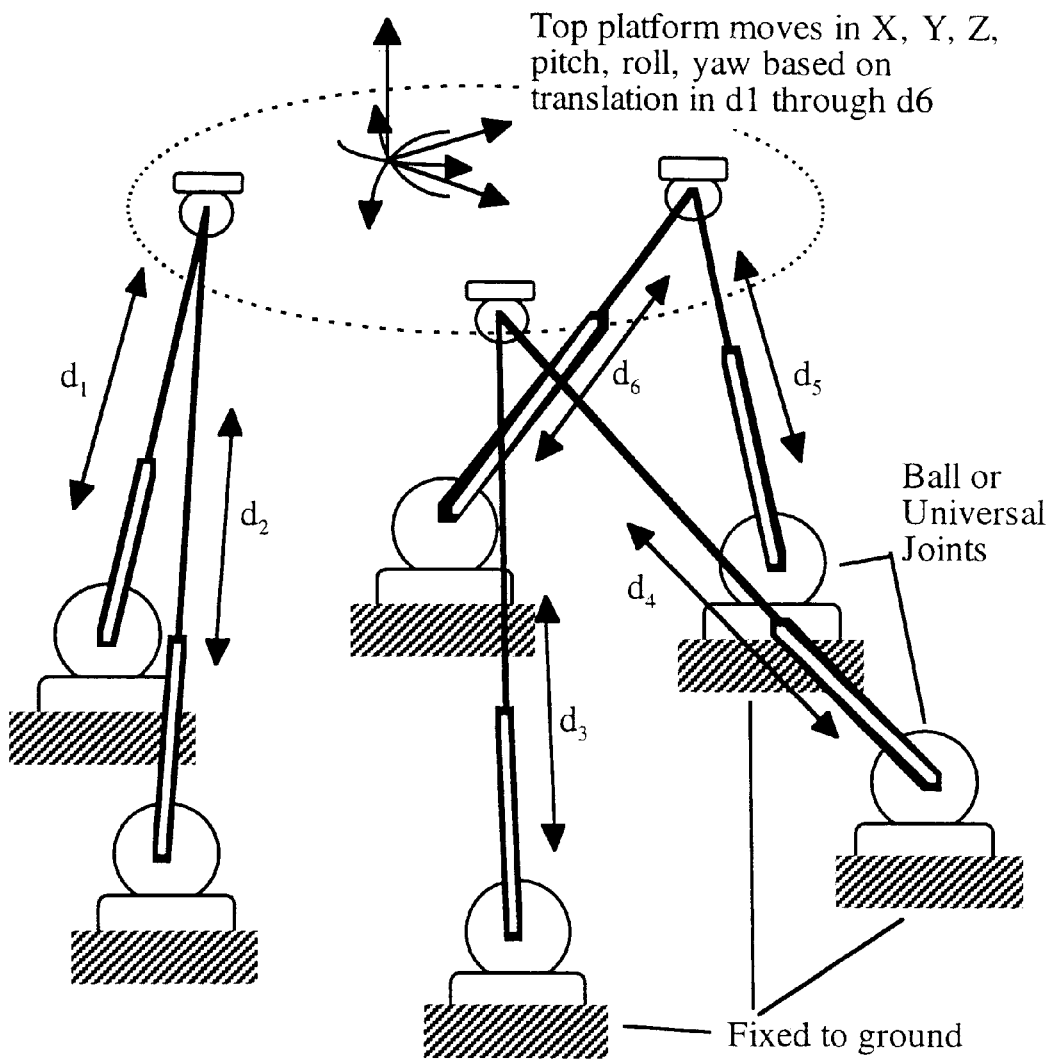
FIG. 3 is a drawing used to introduce and illustrate a "Stewart platform," forming a basis for inventive principles disclosed herein.
Figure 4:
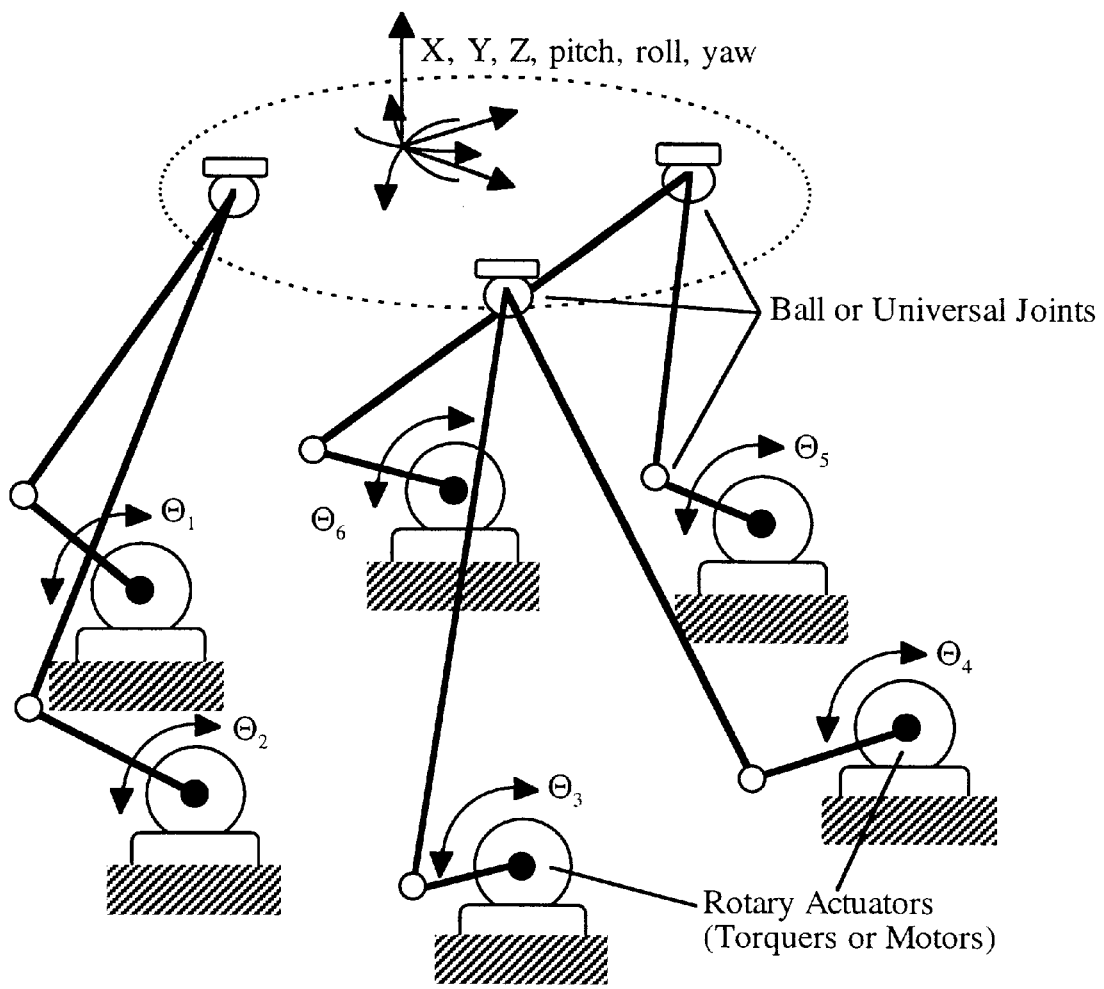
FIG. 4 is one modification of the Stewart platform which uses direct-drive rotary actuators as part of a six-degree-of-freedom design.
Figure 5:
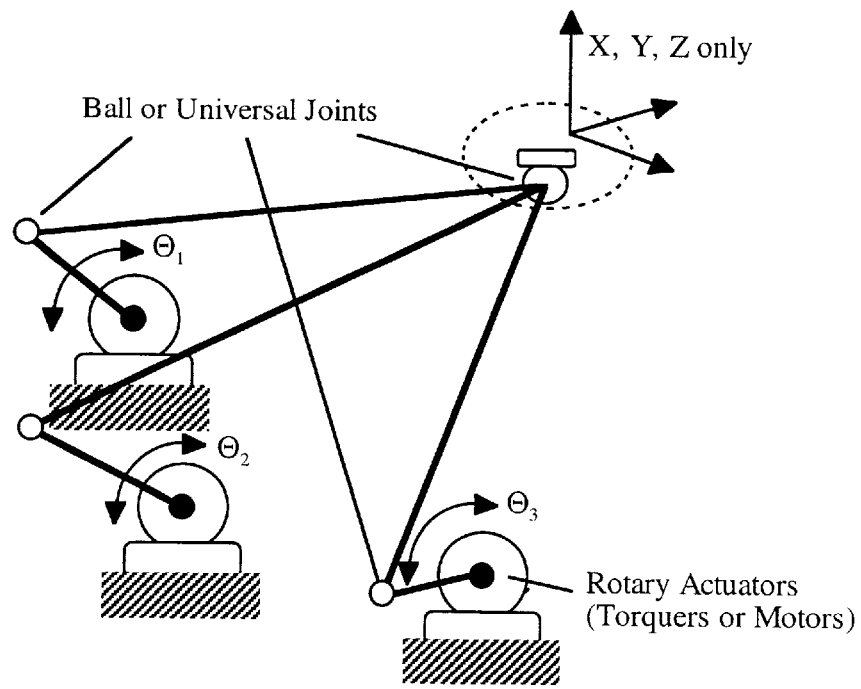
FIG. 5 is a different modification of the Stewart platform utilizing three actuators and linkages as part of a three-degree-of-freedom device according to the invention.

The preferred concept began as a miniature conventional "Stewart platform," as shown in FIG. 3, except that we employed rotary actuators, instead of linear actuators. FIG. 4 depicts one platform design embodiment modified to use direct-drive rotary actuators as part of a six-degree-of-freedom design. FIG. 5 depicts an alternative embodiment using only three actuators and linkages for a three-degree-of-freedom device.

From the three-degree-of-freedom design concept of FIG. 5 the device kinematics were computed. This was done through a genetic algorithm which varied motor size, location, and link arm segment lengths to produce acceptable forces levels in all directions at all points in preferred the work envelope (nominally a volume with a mouse pad sized base area and height). The genetic algorithm returned 5 configurations which were evaluated as "the best," considering the kinematics and evaluation cost criteria.

One of these configurations was selected as optimal based on inspection and layout considerations and, most importantly, the clearance of obstacles by the links. One problem with the mathematical analysis was that some positions within the workspace were not physically reachable due to the combination of link position, motor stack length, and motor diameter. The configuration that was selected was based on results of the genetic algorithm which gave best fitness relative to cost and had the most link clearance. This configuration also offered the best case design for ease of manufacturing.

Figure 6:
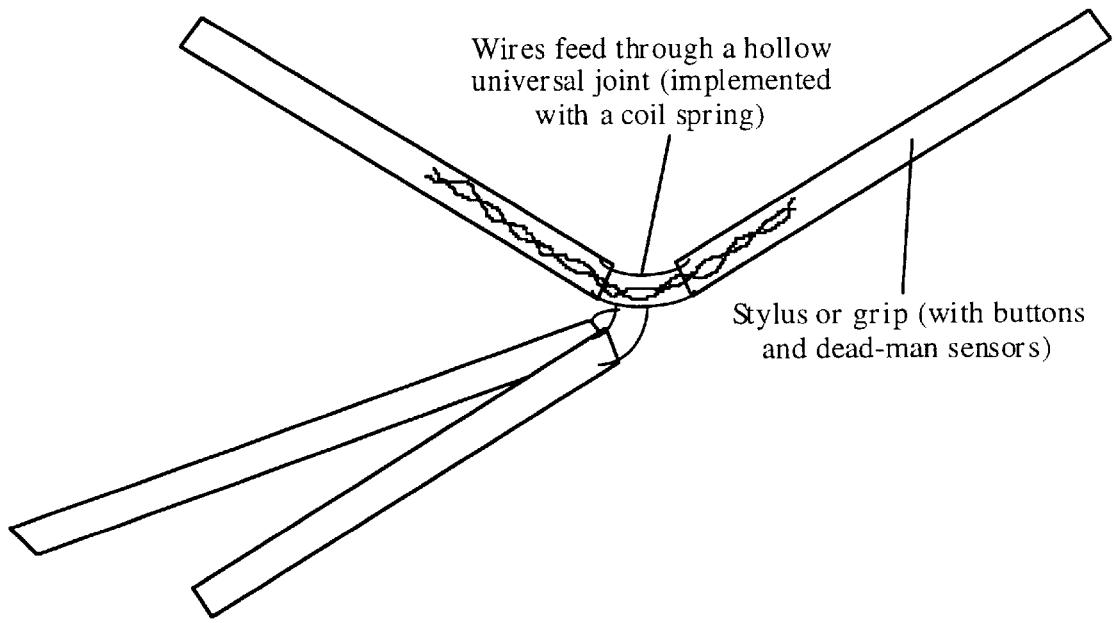
FIG. 6 illustrates how, through the use of hollow tubes and flexible guides, wires may be dressed to an actuator/manipulator.

Another factor which influenced the design process was the wiring and routing of cables. Since the device has a stylus at the end effector with optical sensors and buttons, wires must be run from the main electronics board out to the pen. Due to the number of revolute joints involved, we sought to devise methods for containing the wires such that they would not effect the range of motion of the device (FIG. 6).

Optimal force actuators for a haptic device are small in size, have low rotational inertia, produce high power to torque ratio, and have very low cogging torque. In selecting rotational actuators, we considered motors, torques, and rotational solenoids. Our geometric optimization for the this device dictated larger angular displacements than can be achieved by currently manufactured rotational solenoids and single phase torques. Our initial design used pancake motors, which performed well (good torque, very low cogging, and good package geometry). This style motor, sometimes referred to as a multi-phase torque, is designed to produce high torque at low speeds. Because of cost and availability considerations we switched conventional cylindrical brush motors with skewed stators. The trade off of motor size, power consumption, and drive electronics dictate the motor size and electrical winding characteristics.

Figure 7:
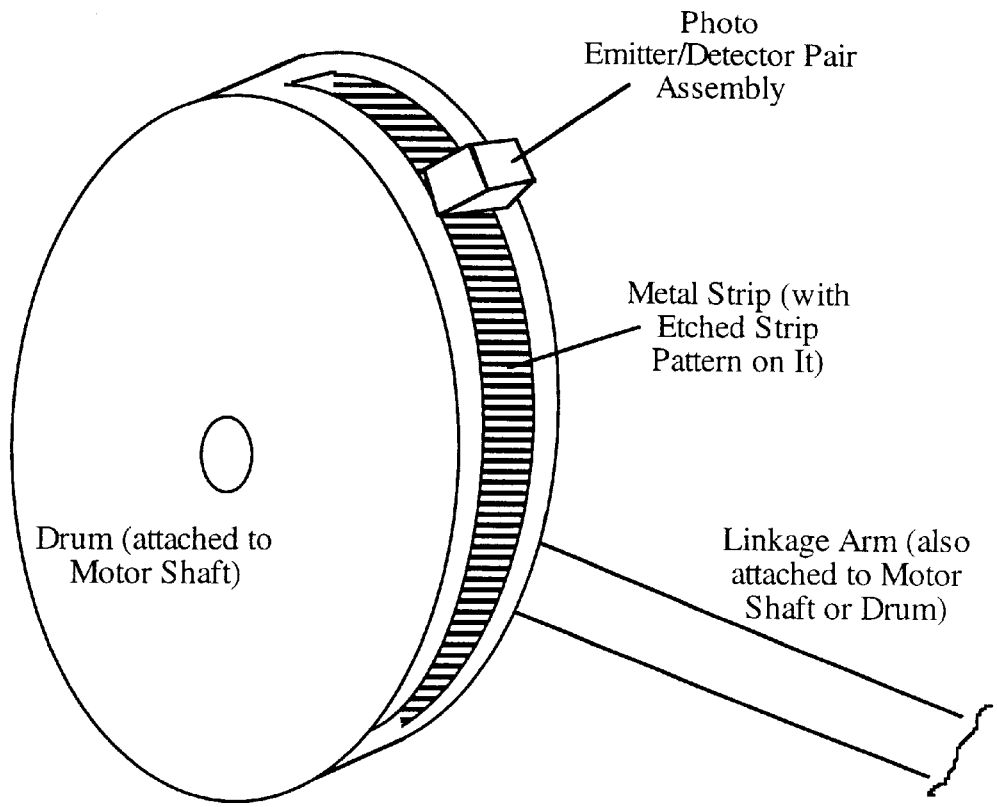
FIG. 7 is a drawing as seen from an oblique perspective illustrating how semiconductor optical sensors and detectors may be mounted on a metallic strip for encoding purposes according to the invention.

Sensor accuracy requirements led us to develop a new type of optical angular position sensor, since no commercially available device provided the resolution we needed in the target price range (early implementations used potentiometers and optical encoders). The sensor is an optical encoder of a relatively large diameter, which gives us positional resolution using standard components. The semiconductor optical sensor, a source and detector pair, is used to see lines etched on a metallic strip having a fixed number of lines per inch (FIG. 7). This allowed us to select the resolution desired by varying the diameter of the plastic encoder mounting bracket.

Figure 8:
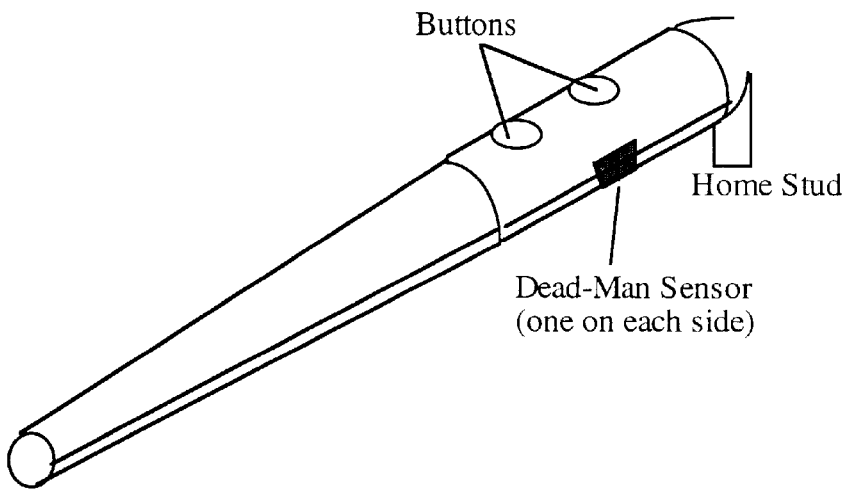
FIG. 8 illustrates a preferred stylus incorporating actuator buttons and a "dead man" switch.

The preferred stylus incorporates two user definable buttons, like a two button mouse, and two optical deadman sensors (FIG. 8). The placement and use of the tactile buttons is designed for comfort and ease of use. Two "deadman" sensors, consisting of infrared emitter/detector pairs, are preferably supported to accommodate both left- and right-handed users.

The use of emitter-detector pairs allows for a much more reliable dead man sensor. By turning on the emitter and monitoring the amount of light received by the detector and then turning off the emitter and again monitoring the amount of light received by the detector it is possible to deduce whether the light that is received at the detector is reflected light from the users finger or ambient light from an external source. The deadman sensors are used as switches that indicate if the user has a firm grip on the device. Per algorithms disclosed in U.S. Pat. Nos. 5,389,865, 5,459,382, 5,629,594, and U.S. application Ser. Nos. 08/845,375, this information is combined with the state of the host and device control software and hardware systems to control whether power can be applied to the actuators safely. Assuming all control systems are functional, power is applied only when the user maintains a firm grip on the haptic stylus.

Figure 9:
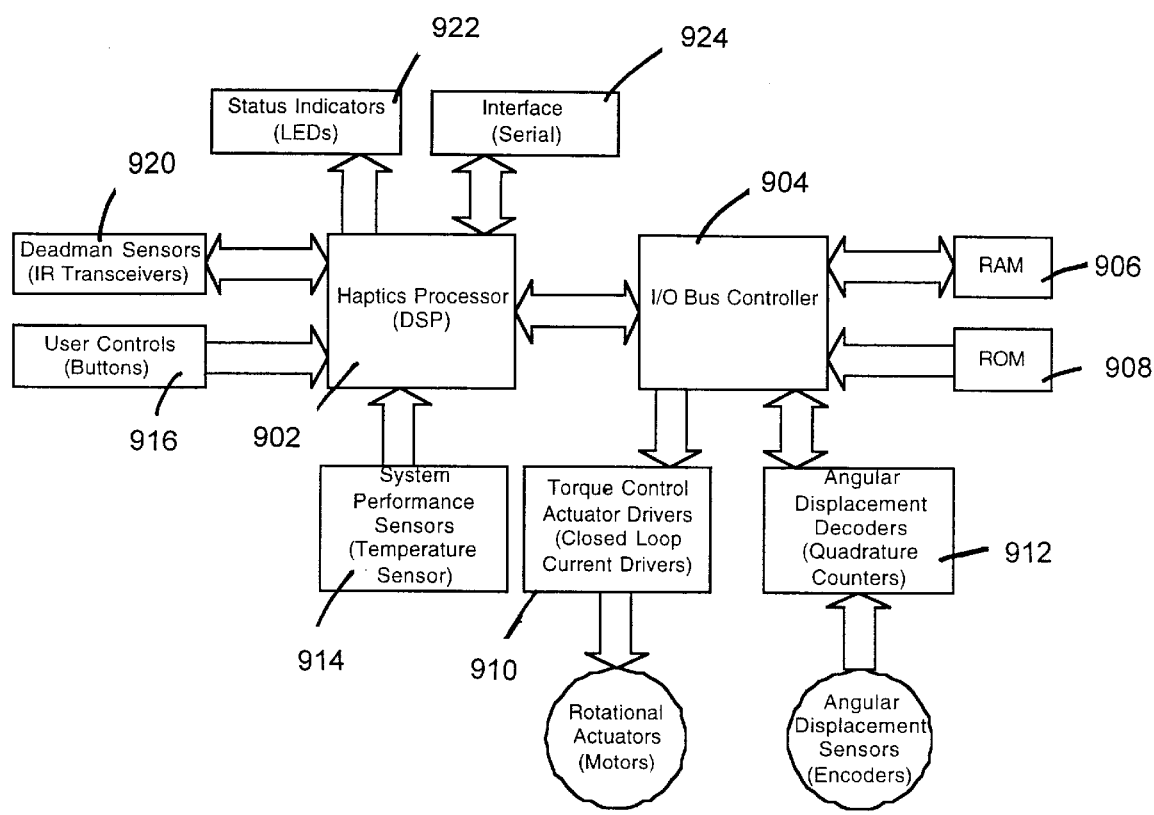
FIG. 9 is a block diagram illustrating major functional electronic subsystems according to the invention.
Figure 10:
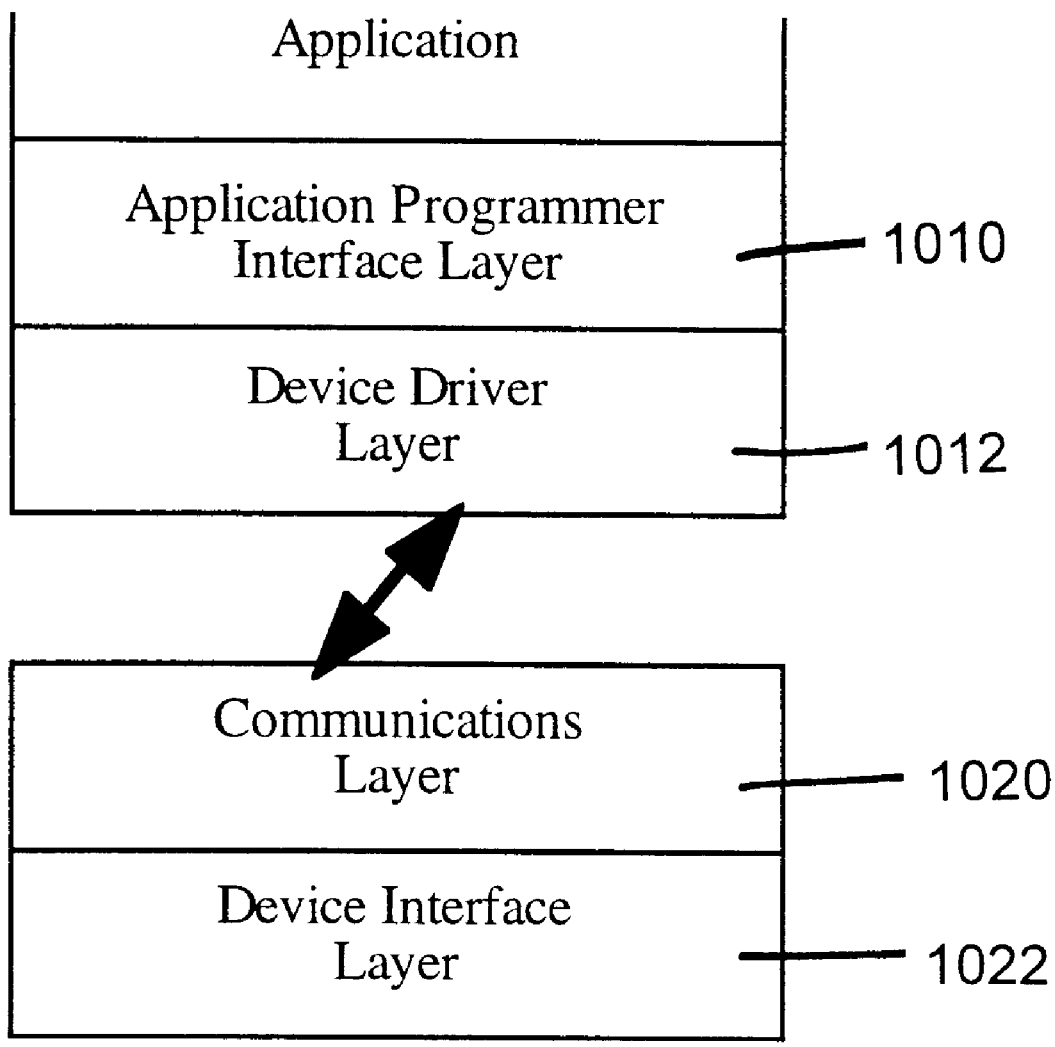
FIG. 10 is a simplified representation of the way in which application and device layers are integrated according to a software aspect of the invention.

Now making reference to FIG. 9, the control electronics includes a haptics processor 902, system I/O bus controller 904, RAM 906, ROM 908, torque control actuators 910, angular displacement decoders 912, system performance sensors 914, user controls 916, deadman sensors 920, status indicators 922, and external host interface 924. Software, shown in FIG. 10, includes an API layer 1010 and device layer 1012 in the host PC and a communications layer 1020 and device layer 1022 in the haptics processor.

Figure 11:
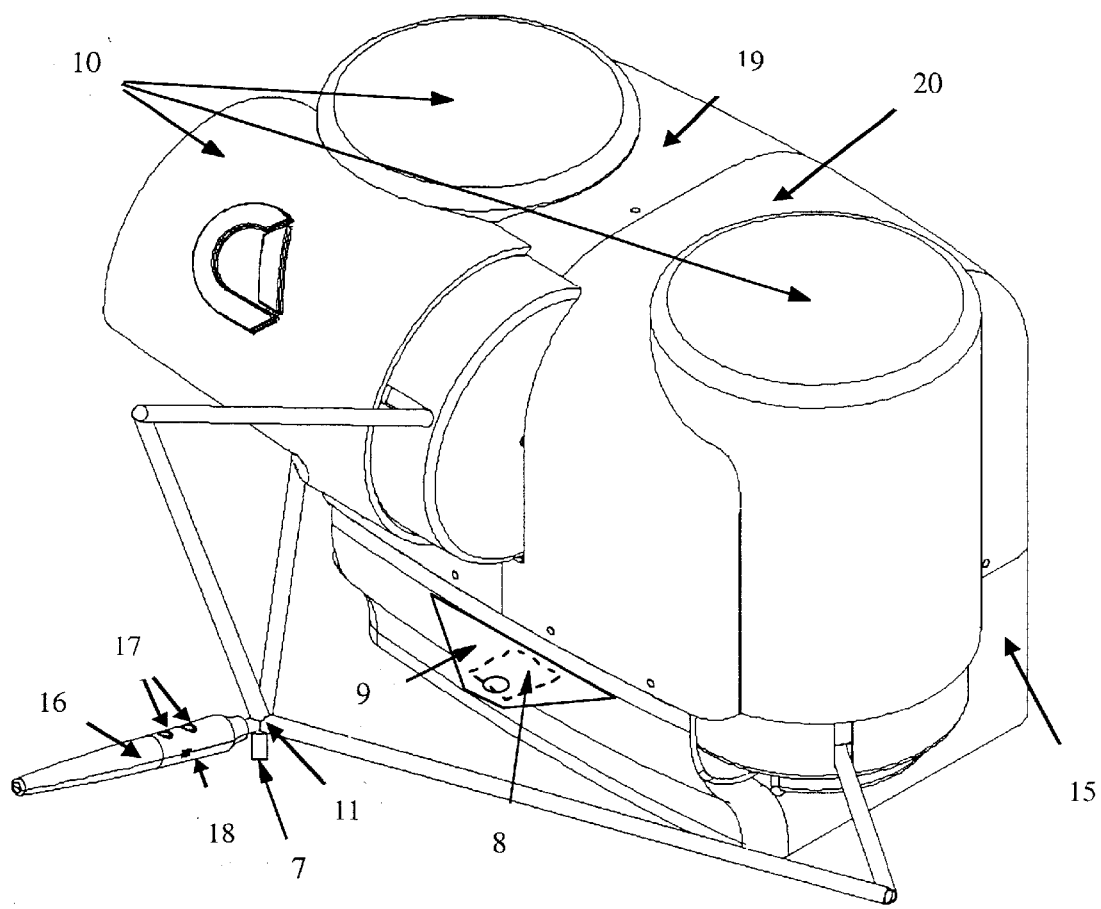
FIG. 11 shows a physical embodiment of a three-degree-of-freedom linkage.

FIG. 11 shows the physical embodiment of the invention with a three degree of freedom linkage set and a handheld stylus. Numerical reference (10) points to volumes defined by DC motor rotary actuators. Items (15), (19), and (20) are parts which make up a segment plastic cover. Item (11) is the universal point where the three linkages are bound together at a single X, Y, Z point, held in position by the user's hand through grasping of the stylus (16). Devices (17) are the cueing buttons actuated by the user's index finger and (18) is one of two infrared deadman's sensors that detect the user's firm grip on the stylus (also shown in FIG. 8).

Figure 12:
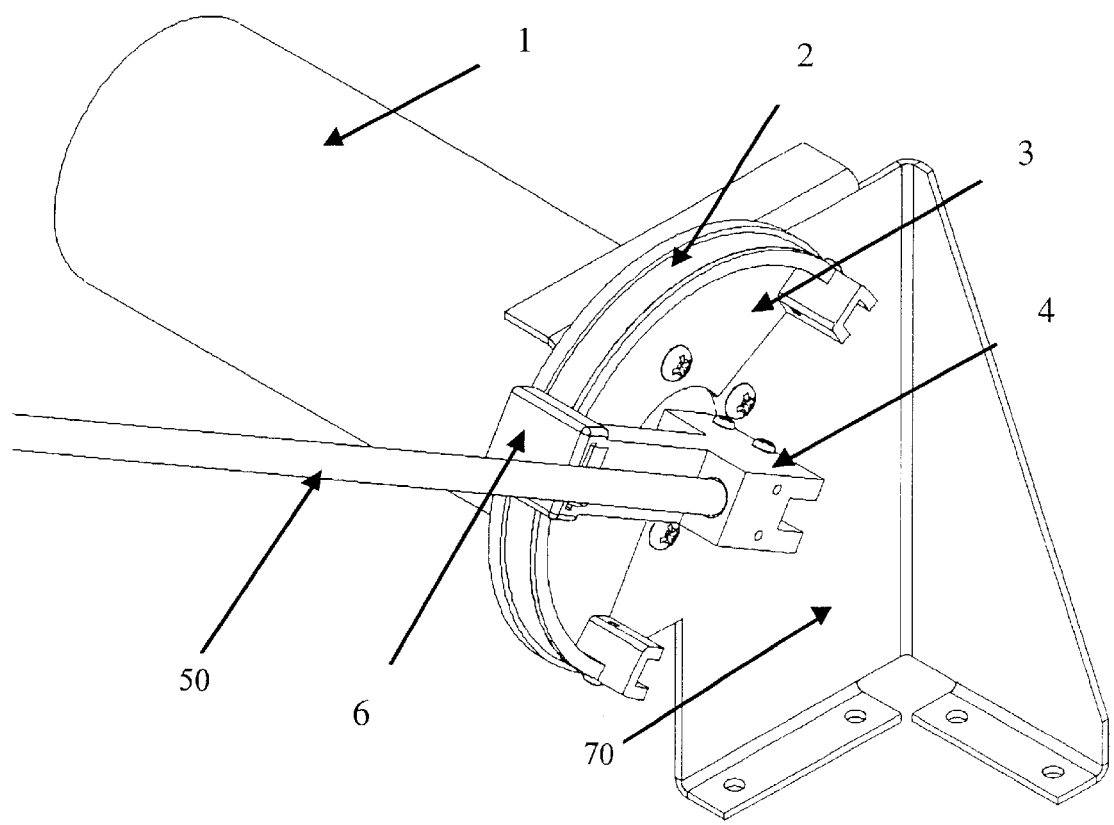
FIG. 12 shows an aspect of the invention wherein, in particular, a rotary actuator is coupled to a rigid rod or tube.

The arrangement of FIG. 11 is a three-axis haptic device that consists of a base platform upon which sit 3 rotational axes. Each of these rotational axes is an actuator-sensor pair, as shown in FIG. 12. An actuator-sensor pair may be defined as a torque producing device that is directly attached to a angle measuring device, typically a motor and encoder. The actuator is commanded from the host computer to produce a torque. The host computer also requests position information, from each axis, which the angle measuring device can provide. The preferred implementation of the actuator is a DC motor (1), although limit angle torques or alternative rotary actuators may alternatively be used. The preferred implementation of the sensor is an optical encoder although inductive or resistive sensor may be substituted.

Since no commercially available sensor met our position sensing and cost requirements, we developed a special optical encoder which consists of a thin metal sheet etched or with markings (2), mounted on a plastic support (3). The optical emitter/detector circuit board (6) is held in place by the rotation arm (4). The entire actuator-sensor pair is mounted to a metal plate (70) which serves to hold the axes in the proper location and orientation.

Figure 13:
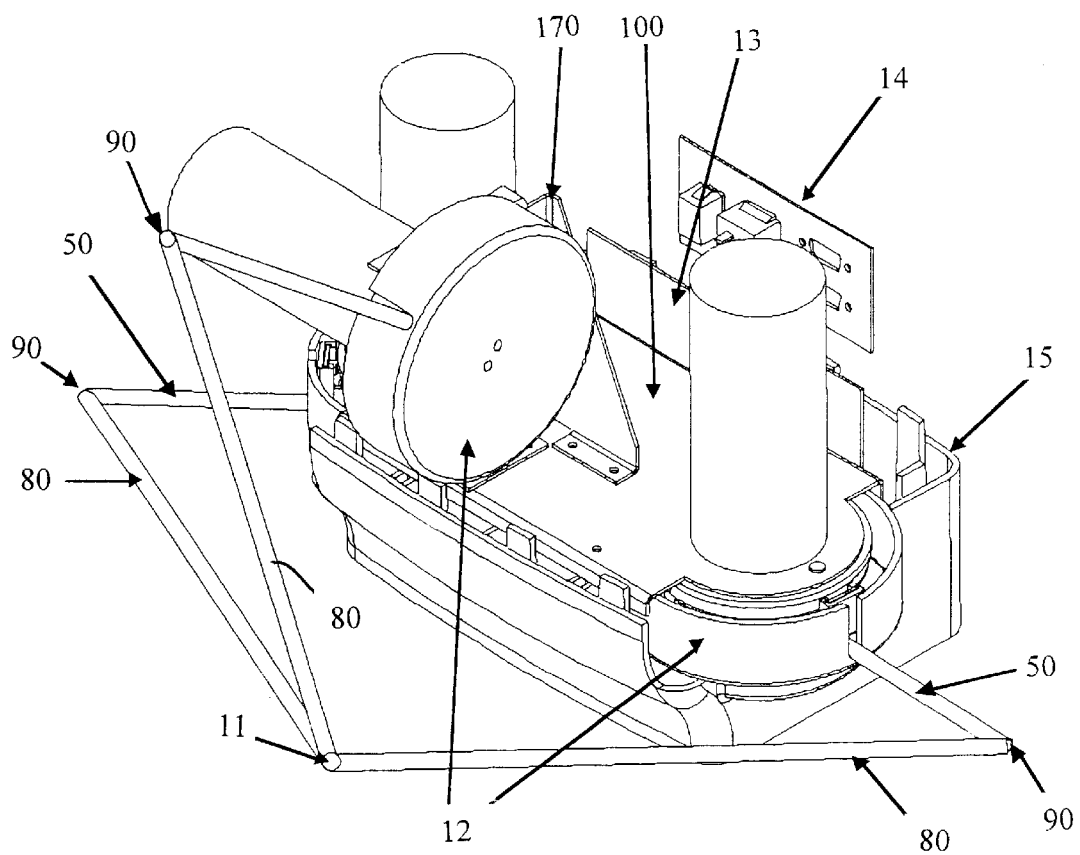
FIG. 13 is a perspective view of a completed three-degree-of-freedom apparatus.

Each rotation axis is connected in the following linkage configuration. The axis of the actuator-sensor pair is directly attached to one end of a stiff link by means of the rotation arm (4). This link is called the proximal links (50) and is typically a metallic or nonmetallic tube. Referring to FIG. 13, the other ends of the proximal link, which moves about a circular path whose center is at the motor axis, are each attached to one end of a second link called a distal link (80), which is also preferably a tube. The distal links are connected to the proximal links by means of a universal joint (90).

The only hard constraint between the proximal and distal link is that these end points must match up, as this design attempts to minimize torque created about the connection point. Consequently, the other ends of the distal links define a sphere whose center is at the proximal-distal connection points. The universal joint just described may be implemented using alternative techniques. For example, we have used flexible rubber connections, extension springs attached at each end into the distal and proximal tubes, and true mechanical universal joints as the joints (90), for example.

Figure 14A:
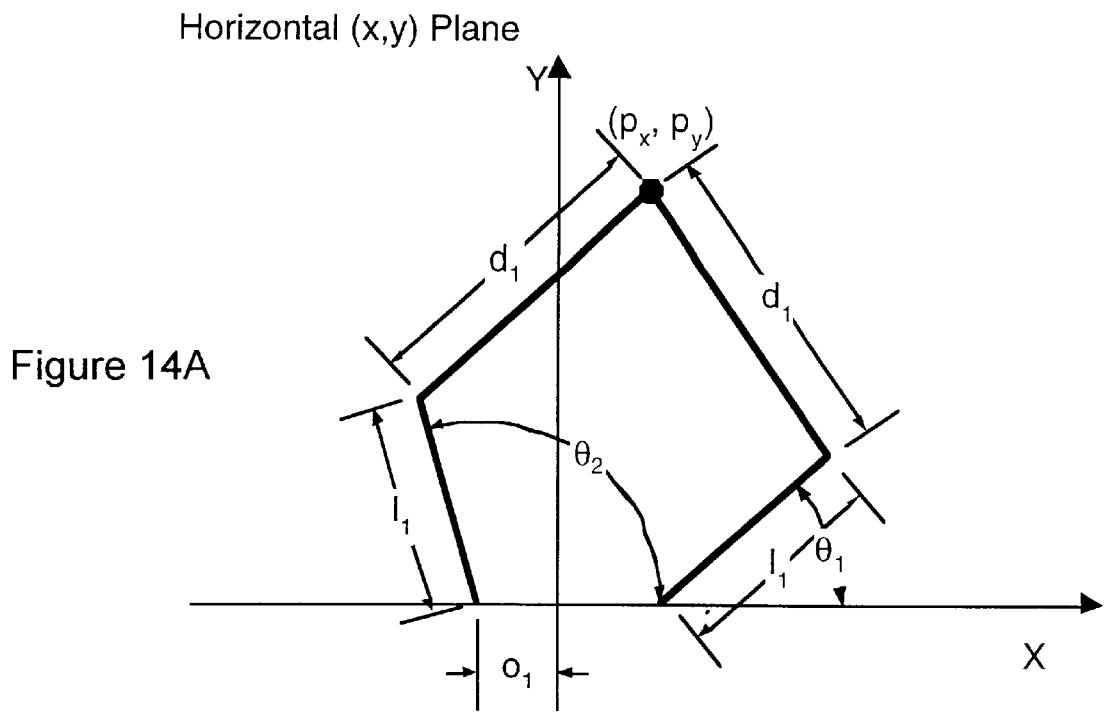
FIGS. 14A and 14B are diagrams which help to illustrate device kinematics in solving from Cartesian coordinates to link vector locations.
Figure 14B:
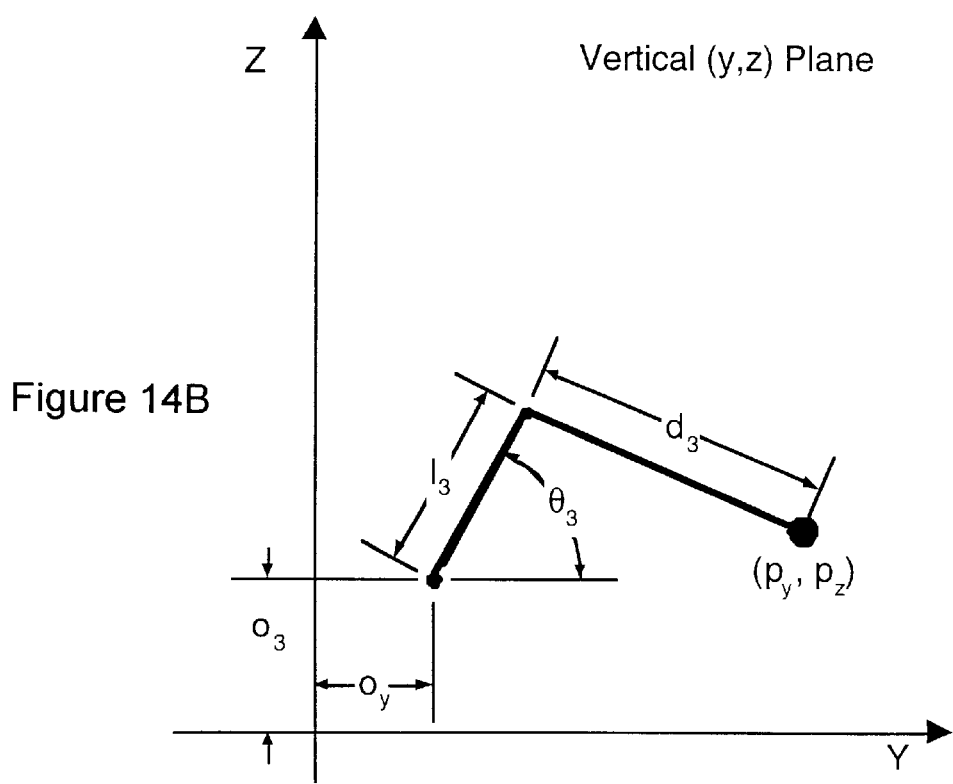

Continuing the reference to FIG. 13, two actuator/sensor pairs are attached to a mounting plate (100). Another plate (170) is attached to the plate (100). These mount plates hold the axes in the proper location and orientation. The "free" ends of all three distal links (80) are connected by means of universal joints, at a point (or as close to a point as possible) called the end-effector (11). The range of motion of the three axes is constrained, such that for any reachable position of the end-effector, there is exactly one configuration of positions for each of the three axes. The Cartesian position of the end-effector may then be calculated from the positions of the three axes. Forces are transmitted to the end-effector point along vectors defined by the distal links. The force at each motor axis may be calculated in real time as a function of the desired Cartesian force at the end-effector. This allows the device to be used as a 3D pointer which allows the user to touch 3D virtual objects. The device kinematics which solve to and from Cartesian coordinates to link vector locations is diagramed in FIGS. 14(a) and (b).

The referring back to FIG. 13, encoders are preferably protected from dust and ambient light by means of the rotation cover (12). The electronics to control the actuators, read the positions, and communicate with the host computer are found on the main electronics board (13). This board connects to the host computer via the connector panel (14) which contains a power switch, plug for AC power, and a communications port. The device is mounted to a plastic base (15).

The external configuration of the device was shown in FIG. 11. A stylus (16) is attached to the end effector (11).

This stylus has two user-programmable buttons (17) and a deadman sensor (18). The preferred implementation of the deadman sensor is an optical switch. The deadman sensor is used to determine when the operator is not holding the device. This information is used as a safety feature to disable the actuators when the device is not in use. The entire device is protected by a cover (19) and (20), which mounts to the bottom cover (15).

Also important is the stylus resting point (9), which incorporates a home switch (8) that notifies the control system that the stylus is at the home position for storage when home stud (7) in FIGS. 8 or 11 is inserted into the resting point (9) of FIG. 11, depressing the home microswitch (8)). When the electronic control powers up the device, and the stylus is known to be at the home position, this allows the system to calibrate the encoder system for absolute X, Y, Z location.

Figure 15:
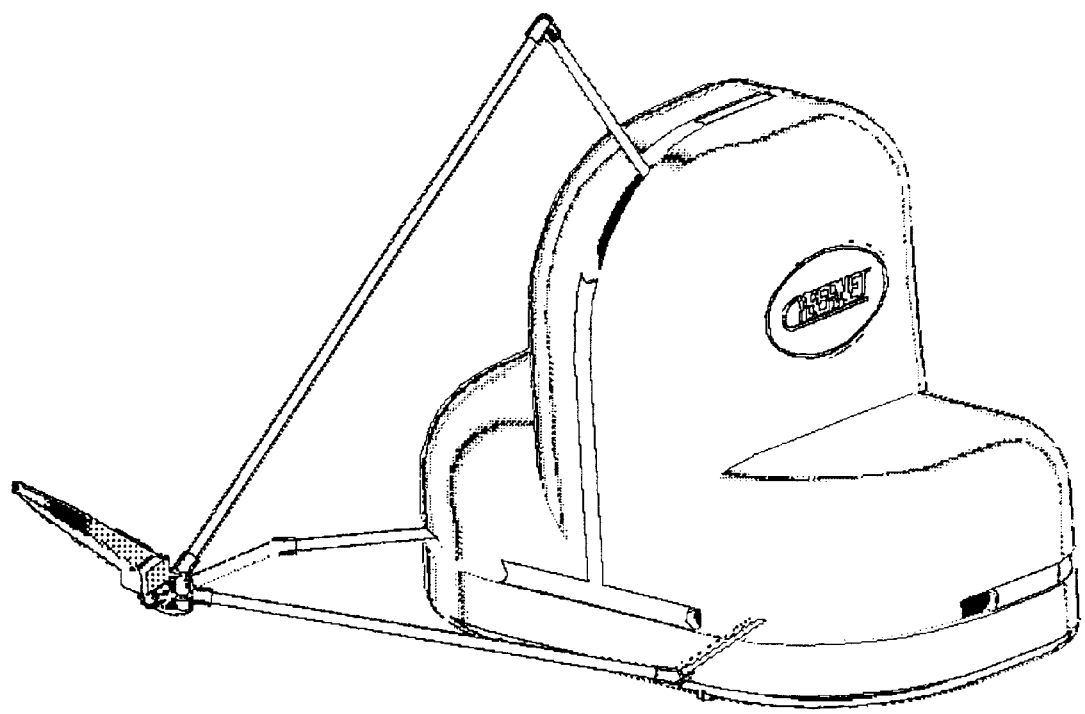
FIG. 15 shows the outline diagram of an alternative embodiment of a three-axis design implemented with DC pancake motors.

FIG. 15 shows the outline diagram of an alternative embodiment of the three axis design which was implemented with DC pancake motors. Because these motors have shorter axis length at the expense of larger motor core diameter, the effect on the overall device design is that the outer housing more closely follows the geometry of the horizontal and vertical mounting plates, as shown in FIGS. 12 and 13 as (10) and (7), respectively.

Some unique features of the this family of device designs are as follows.

The device is designed such that it uses only rotational axes. The design does not require a translational axis.

The device uses extension springs as universal joints between proximal and distal links to avoid.

The device uses extension springs as universal joints between distal links and end-effector to avoid play and reduce production cost (again this applies to the three axis design only).

The device uses hollow tubes as proximal and distal links to allow for routing of cables internal to the device linkages.

The device uses extension springs or rubber tubing as universal joints to allow for routing of cables internal to the device.

The device can be used as a haptically enabled 2D mouse as well as a haptic 3D pointing device.

The device uses a custom linear encoder sensor as a high resolution angular position sensor.

The device incorporates an active home position sensing system to allow quick calibration of the encoder system to a know fixed location for precision motion measurement.

Extension of the design to six degrees of freedom is useful because many objects which might be manipulated in a CAD/CAM design have orientation (pitch, roll, yaw) as well as position (X, Y, Z). The first and easiest modification of the three axis design is for six degrees of measurement but only three degrees of force. This implementation is realized by replacing the extension spring universal joint on one of the three positions (9) in FIG. 13 with a true mechanical universal joint. The preferred position changed is on the link set driven by the motor mounted on the vertical mounting plate (7). Use of a true universal joint allows motion in the joint in two axes while disallowing any twisting motions.

Figure 16:
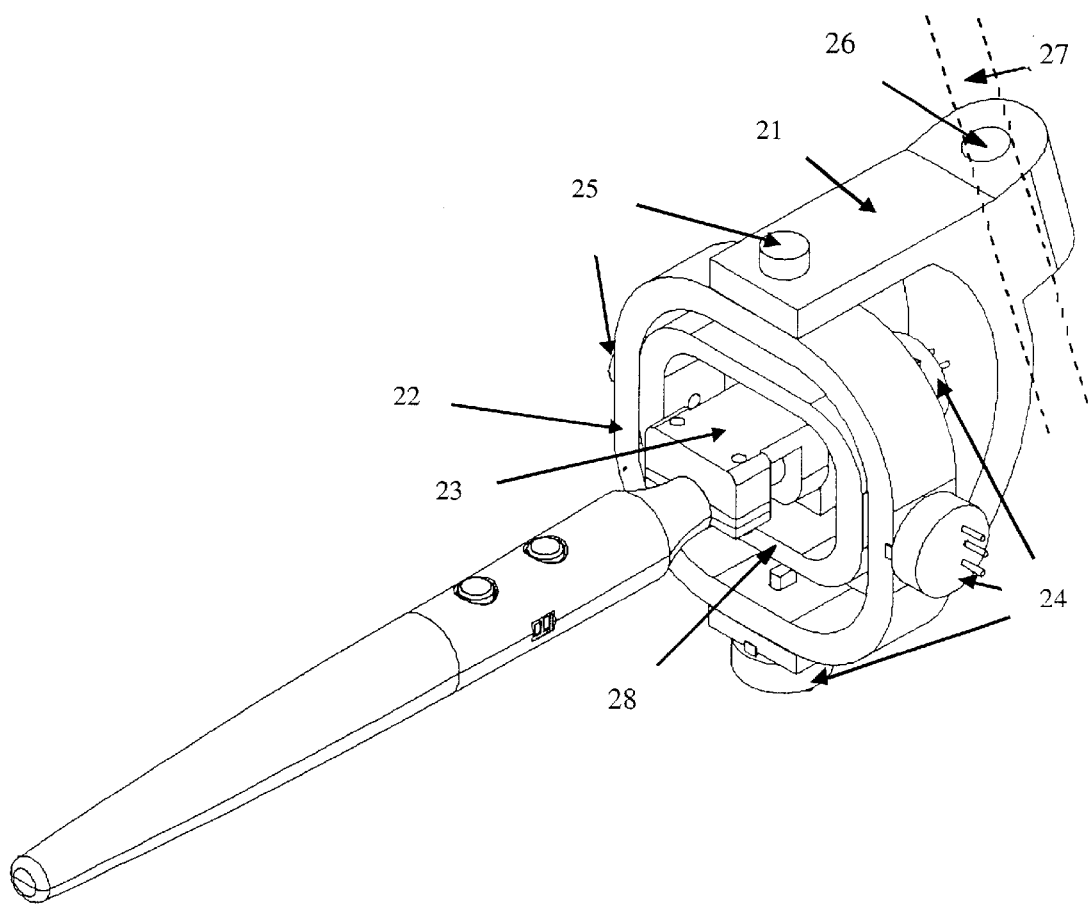
FIG. 16 depicts the design of a three-axis measurement-only end effector which may be substituted for the simple stylus of previous figures.

FIG. 16 depicts the design of a three-axis, measurement-only end effector which can be substituted for the simple stylus previous shown in FIGS. 8, 11, and 15. A cylindrical aperture (26) allows rigid attachment to the distal link shown in dashed lines (27). Referring to FIG. 13, this link is the distal link attached (through a proximal link) to the rotary actuator attached to the vertical mounting plate (7). By rigidly mounting the three axis measurement stage and stylus shown in FIG. 16 in this way, the first three axes position the mount bracket (21) by attachment to (27) through the hole (26) and provide the reference platform for measurement of stylus orientation.

Orientation of the stylus is measured relative to the reference platform (21) by the three potentiometers (24). The potentiometer mounted to the yaw ring (22) measures yaw between (22) and (21). The potentiometer mounted to the pitch ring (28) measures pitch between (22) and (28). The potentiometer mounted in line with the stylus, behind the stylus mount (23), measures roll between (28) and (23). The yaw (22), pitch (28), and roll (23) rings or mounts are connect serially to the reference (21) through bearings (25). Wires from the potentiometers are collected and passed through links along with wires to the buttons and deadman sensors on the stylus.

Figure 17:
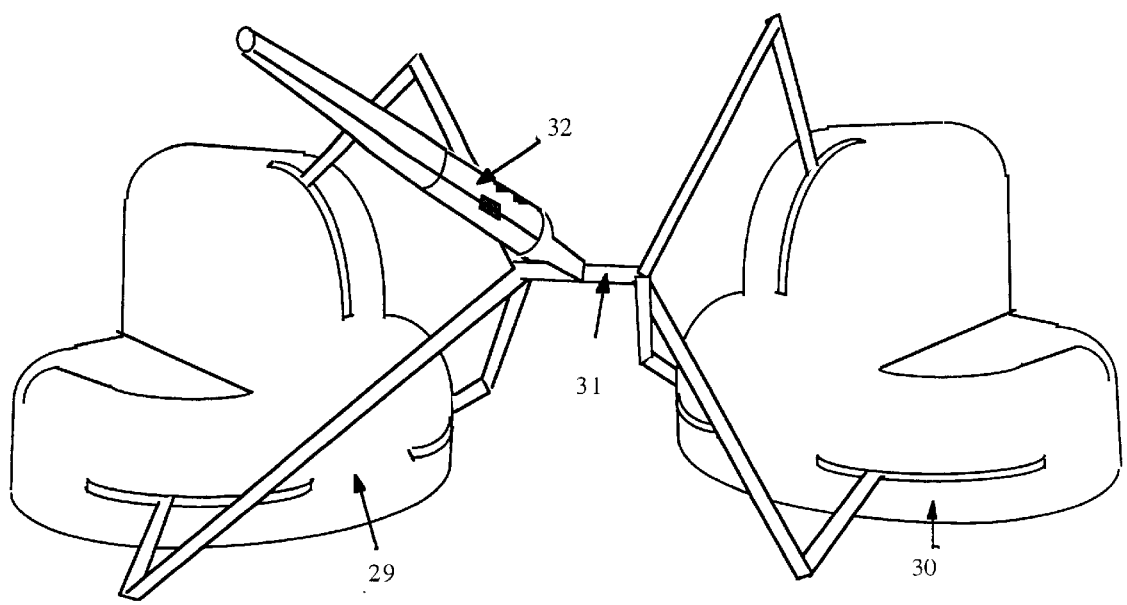
FIG. 17 shows a variation in modifying a conventional Stewart platform by connecting two three-degree-of-freedom systems together through a common linkage and stylus.
Figure 18:
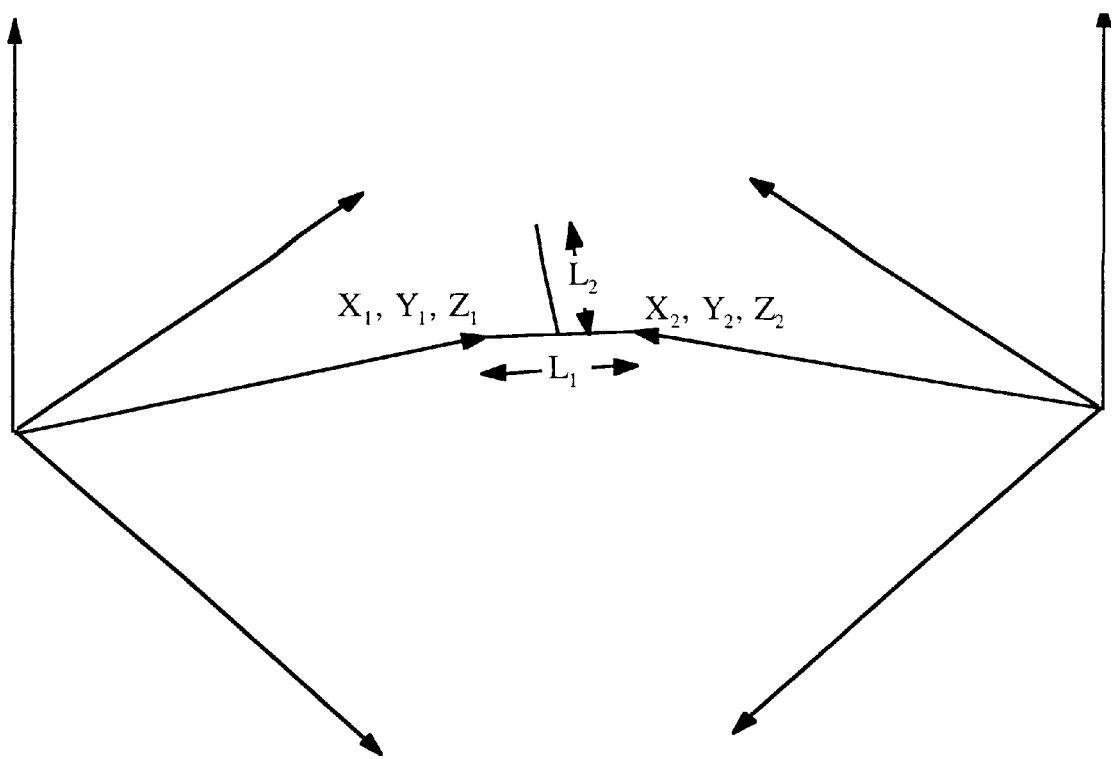
FIG. 18 shows link kinematics for system configuration

An alternative six degree of freedom architecture, which allows forces on all degrees of freedom, may be built using the same components already described in the three dimensional system. In FIG. 4, such a system is shown schematically using a conventional Stewart platform architecture. FIG. 17 shows a variation on this approach which is implemented by connecting two three-degree-of-freedom systems (29) and (30) together with a common link (31) and stylus (32). FIG. 18 shows link kinematics for such a system configuration.

We claim:

1. A haptic pointing device, comprising:
   a plurality of rigid, elongated proximal members, each with a first end and a second end;
   an actuator coupled to the first end of each proximal member, causing each member to swing within a separate plane in response to a control signal;
   a plurality of rigid, elongated distal members, each distal member having a first end interconnected to the second end of a proximal member through an articulating joint; and
   an end-effector interconnected to the second end of each distal member through an articulating joint.

2. The haptic pointing device of claim 1, including three proximal members and three distal members.

3. The haptic pointing device of claim 1, further including:
   a position sensor associated with each proximal member; and
   haptic processing means outputting an electronic signal indicative of the position of the end-effector in space.

4. The haptic pointing device of claim 1, wherein the articulating joints are universal joints.

5. The haptic pointing device of claim 1, wherein the articulating joints are ball joints.

6. The haptic pointing device of claim 1, wherein the articulating joints utilize a flexible material.

7. The haptic pointing device of claim 1, wherein the actuator is a motor having a shaft perpendicular to the plane of movement of the proximal member coupled thereto.

8. The haptic pointing device of claim 1, wherein:
   the end-effector is coupled to a user-graspable element having a preferred orientation in space; and
   the arrangement of the members and joints is such that the element retains the preferred orientation as the end effector is moved by the actuators.

9. The haptic pointing device of claim 8 wherein the user-graspable element is a stylus.

10. The haptic pointing device of claim 8, wherein:

the user-graspable element includes a user control; and at least one pair of the interconnected proximal and distal members is substantially hollow to carry electrical wiring to the control.

11. The haptic pointing device of claim 1, wherein the end-effector is coupled to a user-graspable element, the haptic pointing device further including one or more actuators associated with the articulating joint interconnecting the end-effector to the second ends of the distal members, providing one or more degrees of freedom associated with roll, pitch and yaw.

12. The haptic pointing device of claim 1, including:

a pair of base platforms; and at least two sets of proximal and distal members, each set members being associated with one of the base platforms.

13. The haptic pointing device of claim 12, including:

six sets of proximal and distal members, three sets associated with each of the two platforms.

14. The haptic pointing device of claim 1, further including a docking point to receive the end effector so as to calibrate the end effector in space.

15. A haptic pointing device, comprising:

a plurality of rigid, elongated proximal members, each with a first end and a second end;

a position sensor associated with each proximal member;

an actuator coupled to the first end of each proximal member, causing each member to swing within a separate plane in response to a control signal;

a plurality of rigid, elongated distal members, each distal member having a first end interconnected to the second end of a proximal member through an articulating joint;

an end-effector interconnected to the second end of each distal member through an articulating joint; and haptic processing means operative to:
  a) output an electronic signal indicative of the position of the end-effector in space, and
  b) receive an electronic signal causing the actuators to the end-effector at a pointing space.

16. The haptic pointing device of claim 15, including three proximal members and three distal members.

17. The haptic pointing device of claim 15, wherein the actuator is a motor having a shaft perpendicular to the plane of movement of the proximal member coupled thereto.

18. The haptic pointing device of claim 15, wherein:

the end-effector is coupled to a user-graspable element having a preferred orientation in space; and the arrangement of the members and joints is such that the element retains the preferred orientation as the end effector is moved by the actuators.

19. The haptic pointing device of claim 18, wherein the user-graspable element is a stylus.

20. The haptic pointing device of claim 18, wherein:

the user-graspable element includes a user control; and at least one pair of the interconnected proximal and distal members is substantially hollow to carry electrical wiring to the control.

21. The haptic pointing device of claim 15, wherein the end-effector is coupled to a user-graspable element, the haptic pointing device further including one or more actuators associated with the articulating joint interconnecting the end-effector to the second ends of the distal members, providing one or more degrees of freedom associated with roll, pitch and yaw.

22. The haptic pointing device of claim 15, including:

a pair of base platforms; and at least two sets of proximal and distal members, each set members being associated with one of the base platforms.

23. The haptic pointing device of claim 22, including:

six sets of proximal and distal members, three sets associated with each of the two platforms.

24. The haptic pointing device of claim 15, wherein the haptic processing means is interfaced to a virtual reality system including descriptions of virtual objects enabling a user to interact with the objects through the end effector.

25. The haptic pointing device of claim 15, wherein the haptic processing means is interfaced to a slave system including a separate set of actuators and encoders, enabling a user to interact with the objects through the end effector.

* * * * *